United States Patent
Nicholson et al.

(10) Patent No.: US 6,330,337 B1
(45) Date of Patent: Dec. 11, 2001

(54) AUTOMOTIVE ENTERTAINMENT SYSTEM FOR REAR SEAT PASSENGERS

(75) Inventors: Sterling Christpher Nicholson, Waterford; Dennis Allen, Southfield; Mark Alan Leinonen, Livonia; Daniel Jon Lebioda, Canton; John Michael Dicky, Dearborn, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/487,054

(22) Filed: Jan. 19, 2000

(51) Int. Cl.7 ........................................................ H04B 1/00
(52) U.S. Cl. .............................. 381/86; 381/302; 453/345
(58) Field of Search ................................. 381/86, 123, 77, 381/80, 81, 302, 300; 455/344, 345, 347, 350

(56) References Cited

U.S. PATENT DOCUMENTS

| 4,584,603 | 4/1986 | Harrison . |
|---|---|---|
| 4,866,515 | 9/1989 | Tagawa et al. . |
| 4,982,996 | 1/1991 | Vottero-Fin et al. . |
| 5,034,996 | 7/1991 | Carey et al. . |
| 5,661,811 | 8/1997 | Huemann et al. . |
| 5,666,291 | 9/1997 | Scott et al. . |
| 5,722,069 | * 2/1998 | Donner .................................. 381/86 |
| 5,775,762 | 7/1998 | Vitito . |

\* cited by examiner

*Primary Examiner*—Minsun Oh Harvey
(74) *Attorney, Agent, or Firm*—Larry I. Shelton

(57) ABSTRACT

An automotive multimedia entertainment system includes an integrated rear seat entertainment module in which audio signals coordinated with video entertainment devices in the rear seat can be reproduced using the vehicle's audio system. Multiplex control signals between an audio main control unit, rear seat entertainment module, and CD disc jockey allows free selection of sources for single and dual play modes. By sharing an external audio input of the main control unit, between the rear seat entertainment module and the CD disc jockey, a single version of the main control unit can be used in vehicles either with or without rear seat entertainment modules or CD disc jockeys.

8 Claims, 4 Drawing Sheets

AUTOMOTIVE ENTERTAINMENT SYSTEM FOR REAR SEAT PASSENGERS

BACKGROUND OF THE INVENTION

The present invention relates in general to a rear seat audio and video entertainment system for a passenger vehicle, and more specifically to an architecture for a multimedia entertainment system using a head unit adapted for easy expansion to include a rear seat audio and video entertainment system.

Audio and video entertainment systems integrated in vehicles such as cars, mini-vans, and sport utility vehicles are becoming popular. Special systems for rear seat passengers to watch videos and play video games have been developed.

Portable, self-contained audio and video units are available that can be used-in vehicles and which can even be connected to a vehicle power source. However, integration of audio and video entertainment products into or with a vehicle provide significant advantages in terms of usability and convenience. Furthermore, performance can be improved by interconnecting the entertainment components with the vehicle audio system so that audio can be reproduced over the main vehicle speakers.

Integrating these audio and video systems into a vehicle has an associated cost. Since not all purchasers of a particular model of vehicle may desire to purchase the enhanced video entertainment system, it becomes necessary to produce vehicles with and without such a system. On the other hand, nearly all vehicles are manufactured with an audio system, typically including a radio and at least one playback mechanism for prerecorded media such as audio cassettes or compact discs. The need to obtain distinct audio system components (i.e., an audio system main unit adapted to work with rear seat video entertainment enhancements and a different main unit which does not) and the necessity to coordinate manufacture of different vehicle installations further adds to the total manufacturing costs.

SUMMARY OF THE INVENTION

The present invention has the advantage of providing a flexible architecture for an automotive multimedia entertainment system which is adapted to easily include audio production for rear seat entertainment and rear seat video.

The present invention provides a front main control unit which is adapted to be configured either with or without rear seat video entertainment and provides an overall architecture which minimizes distinct components needed for vehicle manufacturing even though the overall multimedia entertainment system can have various configurations. More specifically, the present invention provides a multimedia entertainment system for a vehicle having a front seat and a rear seat. An audio media player is mounted as a self-contained unit within the vehicle and generates player audio signals. The audio media player may be a compact disc jockey (CDDJ), for example. The video unit generates video signals and coordinated audio signals. A display screen reproduces the video signals and is viewable from the rear seat. A main control unit is mounted for use by a first operator in the front seat and includes a source of main unit audio signals and a front audio processor generating front and rear audio output signals for reproduction by the multimedia entertainment system. The main control unit includes an external audio input that can normally be used for connecting to a CDDJ, but which can alternatively be connected to a rear seat entertainment system. The rear control unit is mounted for use by a second operator in the rear seat and is connected to the audio media player (e.g., CDDJ) and the video unit. The rear control unit includes a source switch for switchably coupling the player audio signals or the coordinated audio signals to the external audio input. A multiplex network interconnects the main control unit and the rear control unit and transmits multiplex messages therebetween. The main control unit sends control commands by transmitting appropriate multiplex messages to the rear control unit and to the audio media player via the multiplex network. The source switch is configured to select either the player audio signals or the coordinated audio signals in response to respective control commands sent by the main control unit.

DETAILED DESCRIPTION OF PREFERRED EMBODIMENTS

Figure 1:
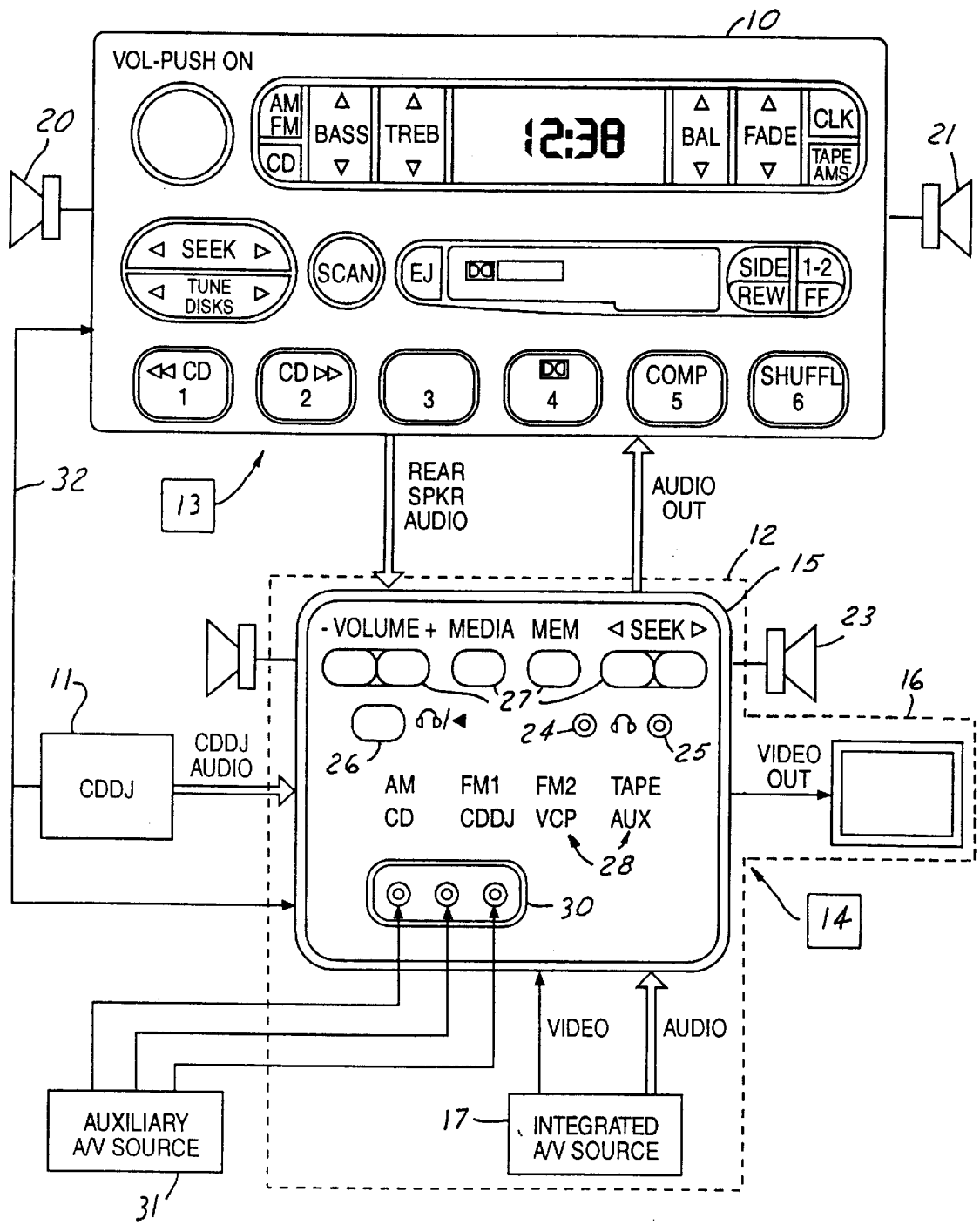
FIG. 1 is a block diagram showing a multimedia entertainment system according to the present invention.

Referring to FIG. 1, a multimedia entertainment system for a vehicle includes a main control unit 10, a remotely-mounted audio media player such as a compact-disc disc jockey (CDDJ) 11, and a rear seat entertainment console 12. Main control unit 10 is mounted for use by a first operator in a front seat 13 while rear console 12 is mounted for use by a second operator in a rear seat 14. Integrally mounted in rear console 12 are a rear control unit or rear seat entertainment module (RSEM) 15 connected to a video screen 16 and an integrated A/V source 17, such as a video cassette player, a DVD player, or a video game unit.

The multimedia entertainment system employs main control unit 10 as the basic, fundamental piece of the system so that a vehicle can be easily produced either with or without the enhanced audio and video functions of rear console 12. Furthermore, a remote media player, such as CDDJ 11, can be connected to main control unit 10 either with RSEM 15 by passing the CDDJ audio output through RSEM 15 or without RSEM by connecting the CDDJ audio output directly to the external audio input of main unit 10.

FIG. 1 shows an enhanced configuration wherein rear seat entertainment features are in place and wherein a dual play mode is available in which rear seat passengers may be listening to audio signals from one source (by using headphones) while the front seat passengers are listening to a different source of audio signals (through the front vehicle speakers). Thus, a left front main vehicle speaker 20 and a right front main speaker 21 are connected directly to main control unit 10. A left rear main speaker 22 and a right rear main speaker 23 are connected to rear seat entertainment module 15. RSEM 15 also includes a pair of headphone jacks 24 and 25 and a-switch 26 for selecting rear seat audio to be played over main speakers 22 and 23 (single play mode) or over headphone jacks 24 and 25 (dual play mode). RSEM 15 also includes push buttons 27 for remote control of audio functions including volume, media selection, memory preset selection, and radio station or media track seek. A plurality of back-lit media indicators 28 illuminate to show the current media selection for the rear seat. Rear seat entertainment module 15 also includes a connector port 30 for connecting to an auxiliary audio/video source 31, such as a video game player, a portable DVD player, a camcorder, or any other source of standard signals (e.g., NTSC).

Main control unit 10, media player 11, and rear seat entertainment module 15 each include respective microcontrollers which communicate over a multiplex network 32. Any known multiplex network may be used such as one using SAE recommended practice J1850 or the controller area network (CAN).

In order to minimize system costs, main control unit 10 is manufactured having only one external audio input. In a vehicle having a CDDJ installed but without rear seat entertainment, the CDDJ audio output can be connected directly to the external audio input of main control unit 10. Likewise, in a vehicle having only a rear seat entertainment installation without an extra media player or CDDJ, an audio output from the rear seat entertainment module is connected to the external audio input of main control unit 10. Where both an audio media player 11 and a rear seat entertainment module are installed in a single vehicle, the media player audio is coupled to rear seat entertainment module 15 and either the CDDJ audio or the coordinated audio signals from a video unit in the rear seat entertainment console, are selectively coupled to the single external audio input of main control unit 10 via a switch in RSEM 15.

Figure 2:
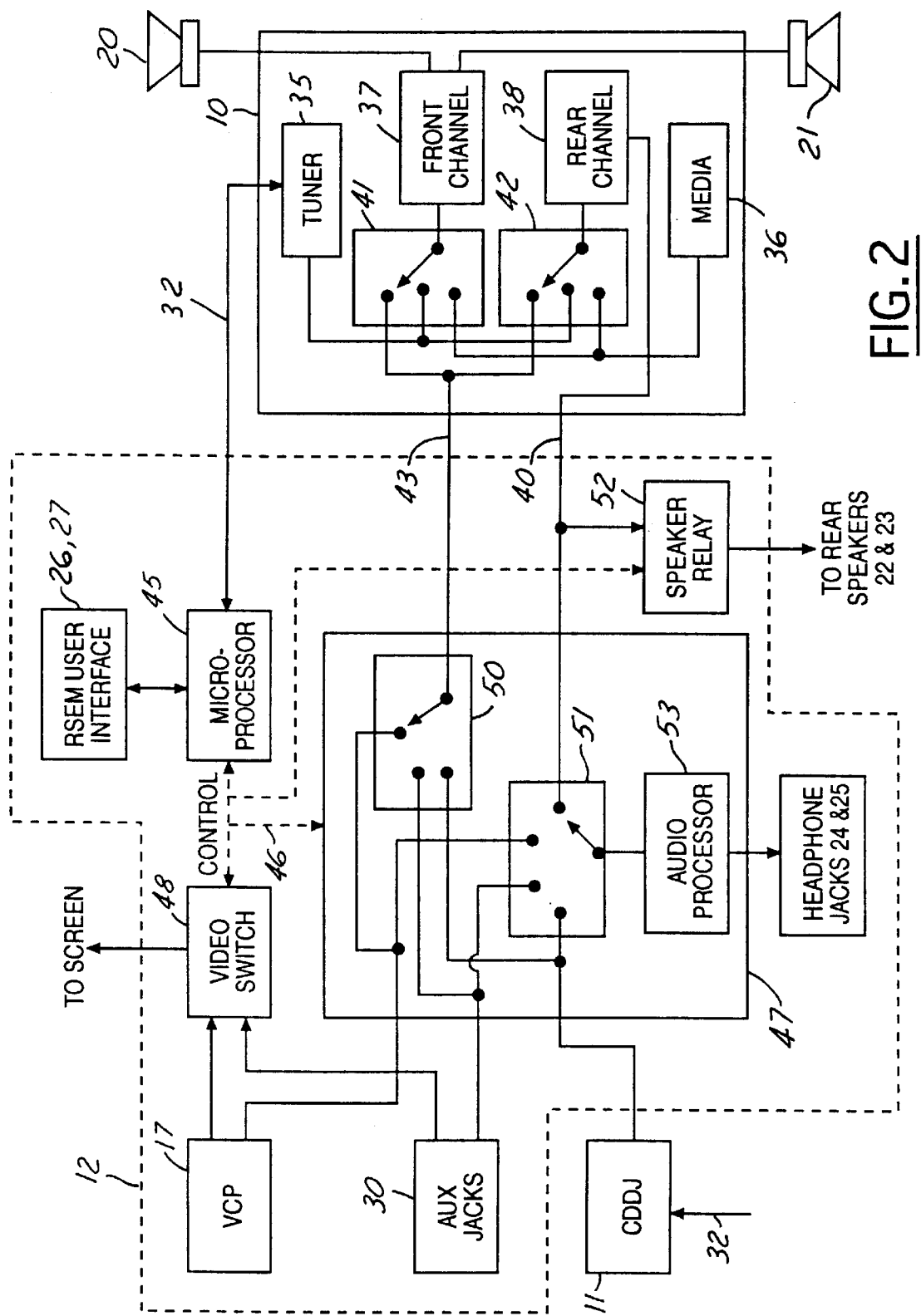
FIG. 2 is a schematic, block diagram showing the main control unit and rear control unit of FIG. 1 in greater detail.

Details of the main control unit and the rear seat entertainment module are shown in FIG. 2. The front main control unit 10 includes a tuner 35 and a media mechanism 36 such as an audio cassette player or a single disc CD player. A front channel audio processor 37 provides front audio signals to speakers 20 and 21. A rear channel audio processor 38 provides rear audio signals to a rear speaker audio line 40 connected to RSEM 15. A first source selector switch 41 has its output connected to the input of front channel audio processor 37 and a second source selector switch 42 has its output connected to the input of rear channel audio processor 38. Selector switches 41 and 42 each have respective inputs connected to the output of tuner 35, media mechanism 36, and an audio outline 43 from RSEM 15. Selector switches 41 and 42 are controlled by a microcontroller (not shown) in main control unit 10 and may be independently controlled to implement a dual play mode in which front and rear seat passengers listen to different sources. Single play mode is obtained by setting selector switches 41 and 42 to the same source. The selector switches are preferably comprised of electronic switches.

RSEM 15 includes a microprocessor 45 which communicates with main control unit 10 via multiplex network 32. Microprocessor 45 also receives commands via the RSEM user interface buttons 26 and 27. Microprocessor 45 transmits local control signals via control lines 46 to an audio switching block 47 and a video switch 48. Video switch 48 selectively connects video signals from auxiliary jacks 30 or integrated video cassette player 17 to screen 16. The coordinated audio signals from auxiliary jacks 30 and video cassette player 17 are connected to respective inputs of selector switches 50 and 51. Analog audio signals from CDDJ 11 are coupled to respective inputs of selector switches 50 and 51. The output of selector switch 50 is coupled via RSEM audio output line 43 to respective inputs of selector switches 41 and 42. Yet another input of selector switch 51 is connected to rear speaker audio line 40 which is also connected to a rear speaker relay 52 (also preferably an electronic switch). The output of selector switch 51 is coupled to headphone jacks 24 and 25 via a headphone audio processor circuit 53 which controls headphone volume in response to microprocessor 45.

As a result of the architecture shown in FIG. 2, main controller unit 10 has access to all rear audio sources using only one external audio input line 43. Main control unit 10 sends a multiplex message via multiplex system 32 to microprocessor 45 in RSEM 15 for configuring source selector switch 50 to provide rear audio signals to be used as a source for the front channel by appropriately configuring selector switch 50. Audio signals from a rear seat source can be used in either single play or dual play modes by appropriately configuring selector switches 41 and 42. In single play mode, microprocessor 45 causes speaker relay 52 to be closed, but causes it to be open in dual play mode so that the rear main speakers are inactive and the headphone jacks are active.

In dual play mode, any sources can be applied to the headphone jacks via appropriate configuration of selector switches 42 and 51. Furthermore, any combination of sources may be obtained as the front (i.e., primary) source and the rear (i.e., secondary) source in dual play mode, with the exception that tuner 35 produces only one broadcast signal at a time and cannot provide different radio stations simultaneously for dual play mode.

Figure 3:
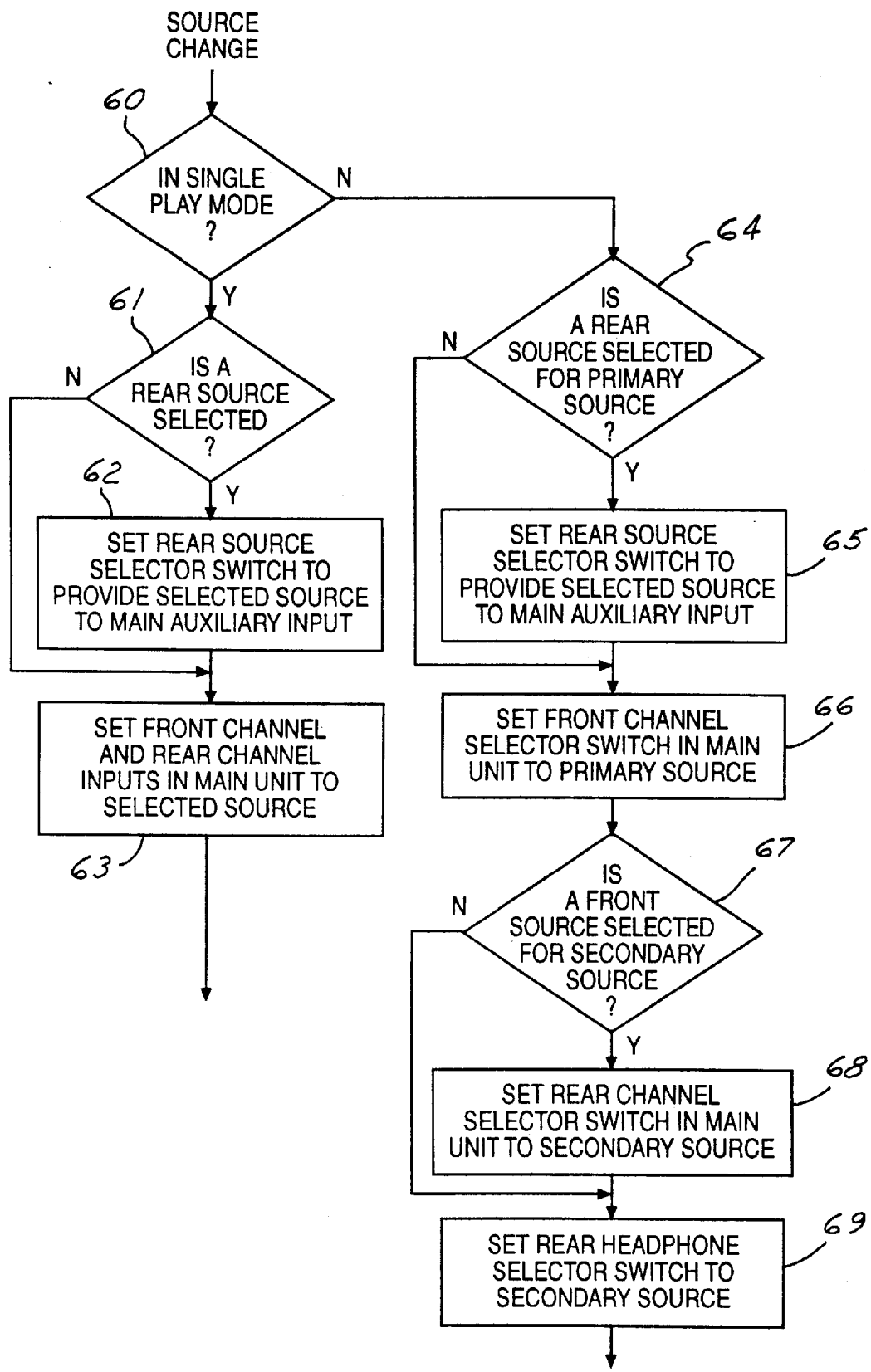
FIG. 3 is a flowchart showing a method for changing a selected audio source in the multimedia entertainment system.

The operation of the present invention during a source change is shown by the flowchart of FIG. 3. Whenever a selected source is being changed, a check is first made in step 60 to determine whether the multimedia entertainment system is currently in single play or dual play mode. If in single play mode, then a check is made in step 61 to determine whether a rear source (e.g., CDDJ, integrated video cassette player, or auxiliary video/game system) is selected. If a rear source is selected while in single play mode, then the rear external source selector switch is set in step 62 to provide the selected source to the main unit external input. If a rear source is not selected in step 61 or after setting of the rear source selector switch in step 62, the front channel and rear channel audio processor selector switch inputs in the main unit are set to the selected source in step 63.

If step 60 determines that the multimedia entertainment system is in dual play mode, then a check is performed in step 64 to determine whether a rear source is selected for the primary source (i.e., the source to be reproduced by the front channel audio processor). If a rear source is selected for the primary source, then the rear external source selector switch is set in step 65 to provide the selected rear source to the main unit external audio input. After setting the rear source selector switch, or if a rear source was not selected for the primary source in step 64, the front channel selector switch in the main unit is set to the selected primary source in step 66. In step 67, a check is made to determine whether a front source has been selected for the secondary source (i.e., the source to be reproduced in dual play mode by the headphone jacks). If yes, then the rear channel selector switch in the main unit is set to provide that secondary source to the rear channel audio processor. Thereafter, the rear headphone selector switch is set to the desired secondary source in step 69 (either local input from a rear source or remote input from the main unit).

Figure 4:
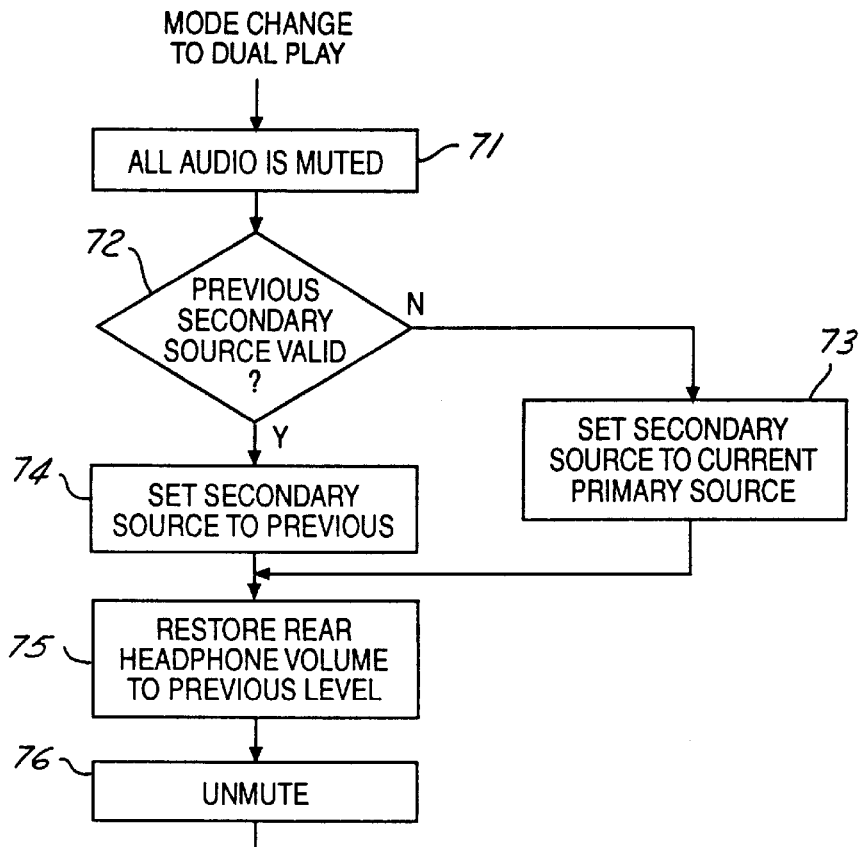
FIG. 4 is a flowchart showing a method for changing from a single play to a dual play mode.

A method for changing mode from single play mode to dual play mode is shown in FIG. 4. Such a change is initiated by pressing the mode change button 26 of FIG. 1, causing a multiplex message to be sent to the main control unit informing it of the button press. First, all audio is muted by the main control unit in step 71. Also, the rear speaker relay is set to its off state in response to a control command sent by the main control unit to the rear control unit. This makes sure that the audio is muted when the relay changes state. In step 72, a check is made to determine whether the previous secondary source (i.e., the source selected for rear seat entertainment the last time dual play mode was active) is valid. For example, if the previous secondary source was the CD player and no disc is currently loaded in the CD player, then the secondary source would not be valid. In that case, the secondary source is set to the currently active primary source in step 73. Otherwise, the secondary source is set to the previous valid source in step 74. After setting the secondary source, the rear headphone volume is restored to its previous level set during the last time dual play mode was active in step 75. All audio is unmuted in step 76.

Figure 5:
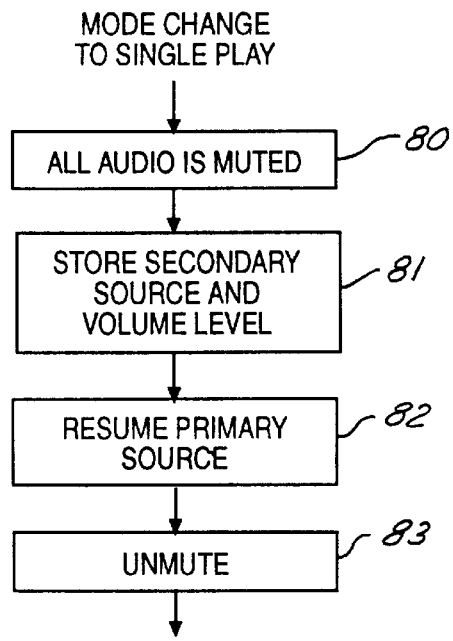
FIG. 5 is a flowchart showing a method for changing from dual play mode to single play mode.

A method for changing mode from dual play mode to single play mode is shown in FIG. 5. All audio is muted in step 80 and the rear speaker relay is changed to its on state. Then, the secondary source currently selected and the current volume level for the rear headphones are stored in step 81. The primary source is resumed for both the front and rear audio channels in step 82 and the main speakers are all unmuted in step 83.

What is claimed is:

1. A multimedia entertainment system for a vehicle having a front seat and a rear seat, comprising:

a video unit generating video signals and coordinated audio signals;

a display screen for reproducing said video signals and viewable from said rear seat;

a main control unit mounted for use by a first operator in said front seat, said main control unit including a source of main unit audio signals and a front audio processor generating front and rear audio output signals for reproduction by said multimedia entertainment system, said main control unit further including an external audio input, said main control unit adapted to operate with an audio media player mounted as a self-contained unit within said vehicle and generating player audio signals;

a rear control unit mounted for use by a second operator in said rear seat and connected to said video unit, said rear control unit adapted to be connected to said audio media player, and said rear control unit including a source switch for selectably coupling said player audio signals or said coordinated audio signals to said external audio input; and a multiplex network interconnecting said main control unit and said rear control unit and transmitting multiplex messages therebetween;

wherein said main control unit sends control commands by transmitting appropriate ones of said multiplex messages for said rear control unit and for said audio media player via said multiplex network, and wherein said source switch is configured to select either said player audio signals or said coordinated audio signals in response to respective control commands sent by said main control unit.

2. The multimedia entertainment system of claim 1 wherein said video unit, said display screen, and said rear control unit are integrally mounted in a vehicle console.

3. The multimedia entertainment system of claim 1 further comprising:

front loudspeakers;

rear loudspeakers;

a rear speaker relay; and a rear audio processor located within said rear control unit and having a rear headphone output, said rear audio processor receiving said rear audio output signals and said coordinated audio signals;

wherein said front audio output signals are coupled to said front loudspeakers, wherein said rear audio output signals are selectably coupled to said rear loudspeakers through said rear speaker relay, and wherein one of said rear audio output signals or said coordinated audio signals are selectably coupled to said rear headphone output whenever said rear headphone output is activated.

4. The multimedia entertainment system of claim 3 wherein said rear speaker relay is controlled in response to respective control commands sent by said main control unit after muting said loudspeakers.

5. The multimedia entertainment system of claim 1 wherein said audio media player is comprised of a compact-disk changer.

6. The multimedia entertainment system of claim 1 wherein said video unit is comprised of a video cassette player.

7. The multimedia entertainment system of claim 1 wherein said video unit is comprised of a DVD player.

8. The multimedia entertainment system of claim 1 wherein said video unit is comprised of a video game player.

* * * * *